United States Patent Office 2,880,066
Patented Mar. 31, 1959

2,880,066

PROCESS FOR PREPARING METAL CARBONYLS

Rex D. Closson, Northville, and George G. Ecke, Ferndale, Mich., and Lloyd R. Buzbee, Huntington, W. Va., assignors to Ethyl Corporation, New York, N.Y., a corporation of Delaware No Drawing. Application October 3, 1956
Serial No. 613,593

19 Claims. (Cl. 23—203)

This invention relates to transition metal carbonyls and to a novel method for the preparation of these compounds, particularly chromium and manganese carbonyls.

The transition metal carbonyls are useful compounds both as chemical intermediates and in certain direct commercial uses. In the past great difficulty has been experienced in preparing certain of these transition metal carbonyls in high enough yield to make their use commercially feasible. In particular no process has been known heretofore which produces manganese carbonyl in sufficient yield to make its industrial application an achieved practicality, even though this compound is known to have valuable utility both as an antiknock agent in liquid hydrocarbon fuels, and as an intermediate for preparing other manganese compounds.

It is therefore, an object of this invention to provide a novel process for the synthesis and manufacture of transition metal carbonyls. Another object is to provide a process for the manufacture of chromium carbonyl. A particular object of this invention is to provide a process for the production of manganese carbonyl in good yield.

The above and other objects from this invention are accomplished by a process for preparing transition metal carbonyls which process comprises reacting carbon monoxide with a transition metal ketyl. The ketyls used in the process of this invention have the general formula $$\begin{bmatrix} R_1 \\ | \\ R_2-C-A- \\ | \\ R_1-C-A- \\ | \\ R_2 \end{bmatrix}_x M_y$$

wherein M is a transition metal, that is, a metal selected from groups IVB, VB, VIB, VIIB, and VIII of the periodic table; A is an element of group VI of the periodic table having an atomic number no greater than 16, i.e., the chalkogens, oxygen or sulfur; $R_1$ and $R_2$ are organic groups characterized by the absence of (1) olefinic unsaturation and (2) a hydrogen atom on the carbon atom immediately adjacent the carbon atom to which the chalkogen is bonded; $x$ and $y$ are small whole numbers and depend upon the valence of M, $x$ ranging from 1 to 3 inclusive and $y$ ranging from 1 to 2 inclusive.

The ketyl is formed, for example, as the reaction product of a transition metal salt and a non-transition metal ketyl. The non-transition metal ketyl is conveniently prepared by reacting a non-transition metal with a compound having the formula:

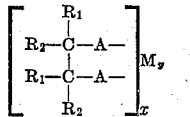

where $R_1$, $R_2$ and A are as defined above. The non-transition metals preferred in the preparation of these ketyls include the alkali metals, alkali earth metals and aluminum.

A preferred class of compounds for the preparation of the ketyls are those in which A in the above formula is oxygen, that is, a ketone. Compounds of this type are preferred because they are, generally, readily available commercial materials and the yields of metal carbonyl obtained by their use are outstanding. Benzophenone is a typical example of such a compound.

Thus, a particularly preferred embodiment of this invention is a process which comprises reacting carbon monoxide with a transition metal ketyl which ketyl is formed as the reaction product of a transition metal salt and mono sodiobenzophenone. This embodiment of the invention is particularly applicable to the synthesis of chromium carbonyl and manganese carbonyl.

The intermediate formed as the reaction product of a ketone of the above described type and a metal is a ketyl having the formula:

$$\begin{array}{c} R_1 \\ | \\ R_2-C-O-M \\ | \\ R_2-C-O-M \\ | \\ R_1 \end{array}$$

where $R_1$ and $R_2$ are as defined above and M represents a mono-valent metal. In the case of a divalent metal, one mole of the metal reacts with two moles of the ketone to give intermediate of the formula:

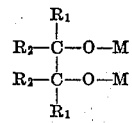

where M' is a divalent metal. A trivalent metal gives an intermediate having the following formula:

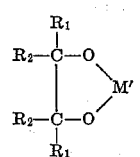

where M" is a trivalent metal. When M, M' and M" in the above formula are transition metals, the intermediate is herein called a "transition metal ketyl," and when M, M' and M" are other than transition metals, the intermediate is referred to as a "non-transition metal ketyl."

The non-transition metal ketyl is prepared from the metal and a ketone meeting the above requirements, by adding the metal to an equivalent amount of the ketone. Alternatively, the reverse procedure may be employed when convenient. When the metal is particularly reactive the process is preferably carried out in an inert atmosphere under conditions such that neither the metal nor the product ketyl come in contact with the air. Thus for example, a dispersion of sodium in mineral oil is added to benzophenone while the system is agitated and kept under a nitrogen atmosphere. It is often advisable to heat the mixture at reflux to prepare the ketyl.

The transition metal ketyl is conveniently prepared from the non-transition metal containing intermediate by metal interchange. That is, a salt of the transition metal is reacted with the non-transition metal ketyl. Elevated temperatures are employed when necessary to complete the reaction.

The transition metal ketyl is also prepared by reacting an appropriate ketone with a non-transition metal in the presence of a transition metal salt. In this manner the transition metal ketyl is prepared from the non-transition metal ketyl as the latter is formed.

The process of this invention is conveniently carried out in an inert solvent. A preferred class of solvents comprise cyclic ethers such as dioxane and tetrahydrofuran.

The transition metal ketyl is reacted with carbon monoxide in the process of this invention to form the transition metal carbonyl. This carbonylation is carried out in a sealed vessel at elevated temperatures and pressures. A preferred method of carrying out the reaction with carbon monoxide comprises pressurizing the vessel with carbon monoxide while the contents of the vessel, that is the reaction mixture from the preparation of the transition metal ketyl, is at room temperature. After the vessel has been pressurized with carbon monoxide and sealed, it is then heated slowly to the reaction temperature and allowed to remain at that temperature until the reaction is completed. Reaction temperatures of from about 50° C. to about 500° C. and pressures from about 200 to about 10,000 p.s.i.g. are employed. Reaction time of from about ½ hour to about 10 hours is ordinarily sufficient.

Embodiments of the instant invention will become apparent by reference to the following specific examples in which all parts are by weight.

Example I

To a glass reaction vessel equipped with gas and liquid inlet means, heating means and reflux condenser was charged 443 parts of tetrahydrofuran and 42 parts of a 55 percent sodium disperision in mineral oil. The contents of the vessel were kept under an atmosphere of nitrogen and 182 parts of benzophenone dissolved in 443 parts of tetrahydrofuran were added slowly to the reaction vessel. During the addition of the benzophenone, the reaction mass first became about the color of a permanganate solution and then on further addition of benzophenone became blue. The permanganate color is believed due to the formation of disodio benzophenone, and the blue is believed to be due to the monosodio benzophenone. The blue reaction mixture was refluxed for two hours and then cooled to about 30° C. at which temperature 63 parts of manganous chloride were added to the vessel. The contents of the vessel were then further refluxed for two hours. The resulting reaction mass contained a product which when treated under pressure with carbon monoxide yielded manganese carbonyl.

Example II

To a pressure resistant vessel having a plurality of gas inlet and outlet means, pressure and temperature measuring devices, heating and cooling means, and an arrangement for charging and discharging liquids and solids, was charged the reaction mass which resulted from the procedure set forth in Example I. The vessel was flushed with nitrogen and pressurized with carbon monoxide at room temperature to 1,400 p.s.i.g. and heated gradually over a 1.6 hour period to a maximum temperature of 200° C. During this heating period, the pressure was not allowed to exceed 3,000 p.s.i.g. The temperature was maintained at 200° C. for one hour. At the end of the hour the vessel was cooled, vented and the contents were discharged. The vessel was washed with 356 parts of ether. The combined ether wash and reaction mass were hydrolyzed and steam distilled. The distillate boiling above 80° C. was collected separately and extracted with benzene. The benzene extract was distilled under reduced pressure almost to dryness, leaving a residue of solid material which was recrystallized twice from benzene to give a 32 percent yield of dimanganese decacarbonyl, which is a yellow-orange crystaline material melting at 156° C. when pure, and has the probable formula $[Mn(CO)_5]_2$. Flame photometric analysis of the benzene extract indicated that a 41 percent yield of crude dimanganese decacarbonyl was produced by the reaction.

Example III

The manganese chloride-sodiobenzophenone reaction product was prepared as described in Example I and was charged to a pressure resistant reaction vessel as described in Example II. The reaction with carbon monoxide was accomplished by pressurizing the vessel to 6,050 p.s.i.g. at room temperature, sealing the vessel and heating to 150° C. over a 1 hour period. The pressure reached a maximum of 10,000 p.s.i.g. The vessel was maintained at 150° C. for 0.7 hour during which time the pressure in the vessel dropped considerably. The reaction vessel was cooled, the contents were discharged and worked up as described in Example II to yield 22 percent of almost pure dimanganese decarcarbonyl. Flame photometric analysis of the crude benzene extract indicated that the reaction produced 33 percent dimanganese decacarbonyl.

Example IV

To a stirred solution in a glass reaction vessel, such as that described in Example I containing 72.7 parts of benzophenone and 311 parts of dry tetrahydrofuran, were added 20.9 parts of a 55 percent sodium dispersion in mineral oil diluted with 13.3 parts of tetrahydrofuran in small increments over a 30 minute period. An immediate color change to royal blue and an increase in viscosity occurred with the evolution of enough heat to maintain the mixture at reflux temperature (65° C.) during the sodium addition. After the sodium addition was complete and the reaction subsided as noted by a temperature drop, 25.2 parts of anhydrous manganous chloride were added. The color changed to a golden yellow, and upon refluxing at 65° C. for about 1 hour and 15 minutes, the color gradually changed to purple. The viscosity of the mixture dropped markedly. The cold reaction mixture, sealed under nitrogen, was charged to a clean, dry and nitrogen-flushed reaction vessel of the type described in Example II. A positive nitrogen pressure was maintained on the system throughout the charging operation. The vessel was pressurized three times with carbon monoxide to 200 p.s.i.g. and vented to 0 p.s.i.g. to purge the system of nitrogen. Finally, the vessel was pressured to 100 p.s.i.g. with carbon monoxide, agitation was commenced and the vessel was heated over a period of 0.8 hour to a reaction temperature of 200° C. At approximately 100° C. a pressure drop occurred and when the pressure had dropped to 400 p.s.i.g. the vessel was repressurized to 500 p.s.i.g. The pressure was maintained between 400 and 500 p.s.i.g. while the temperature was held at 200° C. for 2.25 hours. After this time, the reaction mass was cooled, the vessel vented and the reaction product was worked up as described in Example II. A yield of about 15.8 percent of essentially pure dimanganese decacarbonyl resulted.

Example V

The procedure of Example IV was followed except that the temperature of the reaction vessel was raised to 65° C. over a 45 minute period and was maintained at a maximum carbon monoxide pressure of 3,000 p.s.i.g. for 4 hours at 65° C. The reaction gave a 10 percent yield of $[Mn(CO)_5]_2$. Flame photometric analysis of the benzene extracted steam distillate indicated that the reaction produced 16 percent dimanganese decacarbonyl.

Example VI

The reaction intermediate prepared as in Example I was charged to a pressure resistant vessel of the type described in Example II. The vessel was sealed and heated to 150° C. and maintained at that temperature for 1 hour. The vessel was then pressurized to 3,000 p.s.i.g. with carbon monoxide and the temperature was maintained at 150° C. for an additional hour, after which time the vessel was cooled and the contents were discharged with the aid of 350 parts of ether, hydrolyzed and rectified. A 4 percent yield of dimanganese decacarbonyl was recovered.

*Example VII*

To a glass reaction vessel of the type described in Example I was added 182 parts of benzophenone in 890 parts of tetrahydrofuran and 63 parts of manganous chloride. To this mixture was added 46 parts of a 50 percent sodium dispersion in mineral oil in small increments. The temperature of the vessel was maintained between 20 and 30° C. When the sodium addition was completed, the mixture was refluxed for 0.5 hour, cooled and charged to a pressure resistant vessel of the type described in Example II. The vessel was sealed, charged with carbon monoxide and heated to 200° C. over a one hour period. The temperature was maintained at 200° C. at 3,000 p.s.i.g. for 0.5 hour. The vessel was then cooled and vented, the contents were discharged and steam distilled. Twenty-seven and five tenths parts of dimanganese decacarbonyl were recovered.

The reaction mixture obtained on addition of the sodium to a mixture of benzophenone and manganous chloride was less viscous than the product obtained when manganous chloride was added to the reaction product of the sodium and benzophenone as in Examples I through VI. The procedure used in Example VII greatly facilitates handling of the intermediate from the glass reaction vessel to the pressure vessel used in the carbonylation step of the reaction. Substantially identical yields were obtained regardless of the manner of preparation of the intermediate, however, the procedure as outlined in Example VII is preferred, as the final reaction mixture is not only more easily handled but is obtained with one less heating step than is necessary when the sodium is reacted initially with benzophenone in the absence of manganous chloride.

*Example VIII*

The procedure of Example VII was repeated except that the amount of tetrahydrofuran was reduced to 445 parts. The intermediate obtained upon the addition of the sodium was easily transferred to the pressure resistant vessel. A 27.4 percent yield of dimanganese decacarbonyl was obtained from the reaction.

*Example IX*

The procedure of Example VIII was repeated except that the sodium was added to the mixture of manganous chloride, benzophenone and tetrahydrofuran while the latter was maintained at reflux temperature. Reflux was maintained for 15 minutes after the addition was completed. Reaction with carbon monoxide gave a 31 percent yield of dimanganese decacarbonyl. Examples VIII and IX illustrate that the sodium can be added to either a cool mixture of benzophenone manganous chloride and tetrahydrofuran or to a mixture of the reactants which are maintained at reflux temperature, with substantially equal results. This latter method is advantageous in that a portion of the heat liberated by the sodium addition is utilized in the process.

*Example X*

The procedure of Example I was repeated, using 182 parts of benzophenone, 1330 parts of tetrahydrofuran, 23 parts of sodium as a 55 percent dispersion in mineral oil and 53 parts of chromic chloride. The resulting mixture was reacted with carbon monoxide in a vessel of the type described in Example II over a 1 hour period to 150° C. and 3,000 p.s.i.g. and maintaining these conditions for 0.5 hour. The vessel was cooled, vented and discharged with the aid of 570 parts of ether. The mixture was hydrolyzed, steam distilled, reduced to ⅓ its volume by evaporation, chilled in an ice bath and filtered. The aqueous portion of the steam distillate was chilled and filtered and the residue from the several filtrations were combined to yield 88.3 percent chromium carbonyl.

*Example XI*

A mixture of 134 parts of Michler's ketone, bis-(p-N,N-dimethylaminophenyl)ketone and 890 parts of tetrahydrofuran were heated to reflux in a glass reaction vessel of the type described in Example I. Eleven and one-half parts of sodium as a 55 percent dispersion in mineral oil was added to the refluxing mixture in increments. The resulting blue solution was cooled to 40° C. and 34 parts of manganous chloride were added. The resulting mixture was charged to a pressure vessel similar to that described in Example II and was heated in the presence of carbon monoxide to 150° C. at 3,000 p.s.i.g. over a one hour period and held under these conditions for 0.5 hour. The vessel was then cooled, vented and the contents were discharged, hydrolyzed and steam distilled as described above. An 8 percent yield of dimanganese decacarbonyl was recovered from the distillate.

*Example XII*

The procedure of Example XI was followed using 81 parts phenyl-tert-butyl ketone in lieu of Michler's ketone, and only ½ the amount of tetrahydrofuran. A 7 percent yield of dimanganese decacarbonyl resulted.

*Example XIII*

Following the procedure outlined in Example IV, 182 parts of benzophenone and 1,034 parts of dioxane as a solvent were reacted first with 23 parts of sodium dispersed in mineral oil and 62.5 parts of manganous chloride. This mixture was reacted with carbon monoxide at 150° C. and 3,000 p.s.i.g. for 0.75 hour after being brought to these conditions of temperature and pressure over a one hour period. The reaction yielded 24 parts of dimanganesee decacarbonyl as measured by a flame photometer.

*Example XIV*

The procedure of Example XIII was followed except that 863 parts of the dimethyl ether of ethylene glycol were used as a solvent instead of dioxane. The reaction gave 10.8 parts of dimanganese decacarbonyl.

*Example XV*

Following the general procedure outlined in Example VII 107 parts of manganous bromide and 281 parts of bis-(p-nitrophenyl) thione in 890 parts of tetrahydrofuran are reacted with 40 parts of potassium metal. On reacting the resultant intermediate with carbon monoxide followed by hydrolysis and steam distillation, a good yield of dimanganese decacarbonyl is obtained.

*Example XVI*

Proceeding as in Example XV, 392 parts of chromic sulfate and 335 parts of bis-(p-biphenyl) ketone in 870 parts of toluene are reacted with 9 parts of aluminum and the resulting intermediate is reacted with carbon monoxide to give a good yield of chromium hexa carbonyl.

*Example XVII*

The procedure of Example XV is repeated except that 173 parts of manganous acetate, 12 parts of magnesium and 240 parts of bis-(2,4-dimethyl phenyl) ketone are substituted for the manganous bromide, potassium and bis-(p-nitrophenyl) thione. A good yield of dimanganese decacarbonyl results.

*Example XVIII*

Example XVI is repeated except that 1,034 parts of dioxane, 144 parts (⅓ mole) of chromic iodide, 44 parts (1 equivalent) of strontium and 250 parts of 1-phenyl-2'-ethyl-2,4,5-trimethylheptathione are used to prepare the intermediate. A good yield of chromium hexacarbonyl results.

*Example XIX*

Example VIII is repeated except that the carbonylation is conducted at 50° C. and a pressure of 250 p.s.i.g. Dimanganese decacarbonyl results.

*Example XX*

Example IV is repeated except that the carbonylation is conducted at 50,000 p.s.i.g. and 300° C. These conditions are maintained for only 15 minutes. Dimanganese decacarbonyl is recovered in good yield from the reaction mixture.

*Example XXI*

Example VIII is repeated except that the carbonylation is carried out at 230° C. An excellent yield of dimanganese decacarbonyl results.

The ketyl which is reacted with carbon monoxide in the practice of this invention is derived from a ketone or a thiono compound in which the ketone carbon is substituted with two organic radicals and which contains no hydrogen on a carbon atom adjacent the ketone carbon. These compounds have at least 9 carbon atoms, and those having up to 25 carbon atoms in the molecule are suitable in the preparation of the ketyls used in the process of this invention. Examples of such compounds are 2,2,4,4-tetramethyl-3-pentanethione, bis(tert-butyl)thione, bis phenyl thione, bis(4-nitrophenyl) thione, bis(1,1,3,3,4,4-hexamethylpentyl) ketone, bis(p-biphenyl) ketone, 1-phenyl-2,5-diethyl-2,4-dimethyl-1-hexathione, bis(p-nitrophenyl) thione and the like.

However, a preferred class of ketyls comprise those derived from ketones which have no hydrogen alpha to the ketone carbon and which contain from 9 to about 17 carbon atoms. These compounds are preferred as it has been found that a good yield of metal carbonyl is produced when they are employed. Examples of these ketones are di-tert-butyl ketone, diphenyl ketone (benzophenone), bis(p-dimethylaminophenyl) ketone (Michler's ketone), phenyl-tert-butyl ketone, bis-(m-nitrophenyl) ketone, bis-(1-ethyl-1,3-dimethylbutyl) ketone and the like.

The non-transition metal which is reacted with the ketone in preparing the intermediate ketyl is a reactive metal selected from the group consisting of alkali metals, alkaline earth metals, aluminum and the like. Thus, sodium, lithium, potassium, rubidium, cesium, beryllium, magnesium, calcium, strontium, barium and aluminum are all useful in preparing the non-transition metal ketyl in the practice of this invention. The alkali metals are preferred as it is found that high yields of carbonyl are obtained by their use. Of the alkali metals, sodium is particularly preferred as it is readily available and reacts rapidly with the ketone to give a high yield of ketyl. When the metal used is one which is sensitive to air or water, it is preferably used in the form of a dispersion in a suitable inert carrier such as anhydrous mineral oil. When a less reactive metal is used, it is often advisable to react it as an amalgam.

The transition metal compounds which are used in the process of this invention to produce the transition metal ketyl include generally the ionic compounds of the metal such as the halides including the bromides, iodides and chlorides, the nitrates, sulfates, oxalates, acetates and other ionic organic and inorganic salts. Examples of these are $MnCl_2$, $MnBr_2$, $MnI_2$, $MnSO_4$, manganous oxalate, manganous acetate, $CrCl_3$, $CrBr_3$, $CrI_3$, chromic acetate, chromic sulfate, and the like.

A variant in the process of this invention is to prepare the transition metal ketyl from a 1,2-dihydroxy compound or the diester of a 1,2-dihydroxy compound which does not have any hydrogen alpha to the hydroxy carbon atom. Benzpinicol is an example of such a compound.

The process of this invention is most advantageously carried out in a suitable solvent. In general organic solvents which are inert to the reactants under the conditions of the reaction are suitable. Examples of suitable solvents include benzene, toluene, hexane and like hydrocarbons. Particularly good results are obtained when the solvent employed is an inert, polar, non-reactive cyclic ether, such as dioxane. Tetrahydrofuran is a particularly preferred solvent of this latter type.

When the transition metal ketyl is reacted with carbon monoxide at elevated temperature and pressure higher yields of carbonyl are obtained when the ketyl is contacted with carbon monoxide at temperatures and pressures substantially below final reaction conditions. If after this initial contact the reaction mass is then heated to the proper conditions of temperature and pressure, a good yield of carbonyl results. The process of this invention is also operative when the transition metal ketyl is heated in the absence of carbon monoxide and then contacted with carbon monoxide at elevated temperatures. However, the yield of carbonyl produced by this procedure is substantially lower as illustrated by Example VI.

The carbonylation step is conveniently carried out at carbon monoxide pressures of from about 250 p.s.i.g. to pressures above 50,000 p.s.i.g. Pressures of from 500 p.s.i.g. to 10,000 p.s.i.g. are preferred as a good yield of metal carbonyl can be separated from the reaction mixture when pressures in this range are employed. Pressures of from 500 to 3,000 p.s.i.g. are particularly preferred as they can be safely obtained in readily available processing equipment.

Within the pressure range outlined above the carbonylation step is conveniently carried out at temperatures between 50 and 300° C. Temperatures of from 150 to 230° C. are preferred as an excellent yield of carbonyl is produced at these temperatures.

After the reaction mixture in contact with carbon monoxide reaches reaction conditions, the temperature and carbon monoxide pressure are conveniently maintained until the reaction has produced a high yield of metal carbonyl. If desired, reaction conditions can be maintained until the system no longer absorbs carbon monoxide. However, reaction times of as little as 15 minutes can be employed to give a satisfactory yield of carbonyl. Generally reaction times of between 0.5 hour and 2.5 hours are preferred as excellent yields of carbonyl are obtained in this manner.

The amount of solvent employed in the process of this invention is dependent upon the fluidity required of the reaction mass prior to the carbonylation step and the method of preparation of the transition metal ketyl. When the ketyl is prepared as described in Example VII a lower proportion of solvent can be employed as indicated in Example VIII, due to the increased fluidity of the reaction mass. However, when the procedure used in Example IV is followed, a more viscous intermediate results and thus a higher concentration of solvent is necessary particularly when the intermediate is prepared in a vessel other than that in which the carbonylation is conducted. In general, an amount of solvent equivalent to a weight ratio of from 4:1 to 30:1 of solvent to organic ketone employed is used. The preferred range comprises a solvent to ketone weight ratio of from 5:1 to 10:1 as low viscosity intermediates which yield a high proportion of metal carbonyl are prepared from reaction mixtures employing these proportions of solvents.

The metal carbonyl is recovered from the final reaction mixture by hydrolysis and steam distillation followed by extraction of the distillate with a suitable solvent and crystallization of the carbonyl from the solvent. For example, dimanganese decacarbonyl is extracted from the steam distillate by the use of such inert organic solvents as cyclohexane, benzene, toluene and the like.

As pointed out above, the transition metal carbonyls prepared by the process of this invention find utility as fuel additives, and in particular manganese carbonyl is an antiknock agent of outstanding effect in gasoline and other liquid hydrocarbon fuels.

The term "gasoline" pertains to a liquid hydrocarbon and is inclusive of mixtures of aliphatic, olefinic, aromatic and naphthenic hydrocarbons derived from mineral sources such as petroleum, coal, shale and tar sands, and which includes straight run, reformed, cracked and alkylated stocks, and mixtures of these. The initial boiling point can be from about 70 to about 90° F. and the final boiling points vary from less than 300 to more than 440° F.

To a gasoline meeting the above requirements was added various quantities of dimanganese decacarbonyl and the mixtures were agitated to give a homogeneous fuel blend. Tests were conducted of these fuel blends using a single cylinder CFR standard test engine according to the American Society for Testing Materials; procedure D908–51 to determine the octane number of the fuel containing the dimanganese decacarbonyl and the identical fuel with no antiknock additive. This procedure is referred to as the Research Method for Antiknock Testing. The addition of dimanganese decacarbonyl in quantities sufficient to give O.5, 1.0, and 1.5 grams of manganese per gallon of fuel, resulted in fuels having octane ratings of 84.9, 88.1 and 90.8 respectively. The fuel which contained no dimanganese decacarbonyl gave an octane number rating of 77.1. 3.75 grams of lead as tetraethyllead are required to produce an octane number increase in this fuel equal to that produced by the addition of 1.5 grams of manganese as dimanganese decacarbonyl. The dimanganese decacarbonyl is, therefore, 2.5 times as effective as tetraethyllead.

When employed as an antiknock agent, the dimanganese decacarbonyl prepared by the process of this invention is conveniently used in conjunction with other fuel additives. Thus, other antiknock agents, scavengers, dyes and antioxidants are advantageously added to the fuel along with the metal carbonyl. Similarly, antiknock fluid compositions containing any or all of the above ingredients in addition to the metal carbonyl find utility as fuel additives.

The various other metal carbonyls, such as chromium, iron carbonyl, nickel carbonyl, cobalt carbonyl, and the like, find various uses which are well known in the art. For example, chromium carbonyl and iron carbonyl find utility in the gas phase plating of other metals. Further, these compounds are a convenient source of the pure metal by the decomposition of the carbonyl.

We claim:
1. A process for preparing a transition metal carbonyl wherein the transition metal is selected from the class consisting of the metals of groups IVB, VB, VIB, VIIB and VIII of the periodic table which comprises reacting carbon monoxide with a transition metal ketyl.
2. Process of claim 1 wherein said ketyl is derived from a ketone.
3. A process for preparing dimanganese decacarbonyl which comprises reacting carbon monoxide with a ketyl prepared by the reaction of mono sodiobenzophenone and manganous chloride.
4. A process for preparing a group VIIB metal carbonyl which comprises reacting carbon monoxide with a group VIIB metal ketyl wherein said ketyl is derived from a ketone.
5. A process for preparing manganese decacarbonyl which comprises reacting carbon monoxide with a ketyl wherein said ketyl is derived from a ketone.
6. Process for preparing a group VIB metal carbonyl which comprises reacting carbon monoxide with a group VIB metal ketyl wherein said ketyl is derived from a ketone.
7. The process of claim 6 wherein the group VIB metal is chromium.
8. Process for preparing a transition metal carbonyl wherein the transition metal is selected from the class consisting of the metals of groups IVB, VB, VIB, VIIB and VIII of the periodic table which process comprises reacting a non-transition metal ketyl with a transition metal salt to prepare an intermediate transition metal ketyl and thereafter reacting said transition metal ketyl with carbon monoxide.
9. The process of claim 8 wherein the ketyl is derived from a ketone.
10. The process of claim 9 wherein the non-transition metal ketyl is an alkali metal ketyl.
11. The process of claim 10 wherein the transition metal salt is a group VIB metal salt.
12. The process of claim 11 wherein the group VIB metal salt is a chromium salt.
13. The process of claim 10 wherein the transition metal salt is a group VIIB salt.
14. The process of claim 13 wherein the group VIIB metal salt is a manganese salt.
15. A process for preparing a transition metal carbonyl wherein the transition metal is selected from the class consisting of the metals of the groups IVB, VB, VIB, VIIB and VIII of the periodic table which comprise reacting carbon monoxide with a transition metal ketyl at carbon monoxide pressures from 250 p.s.i.g. to 50,000 p.s.i.g. and temperatures between 50 and 300° C.
16. A process for preparing dimanganese decacarbonyl which comprises reacting carbon monoxide at pressures from about 250 p.s.i.g. to about 50,000 p.s.i.g. and temperatures between about 50 and 300° C. with a ketyl prepared by the reaction of mono sodiobenzophenone and manganous chloride.
17. A process for preparing dimanganese decacarbonyl which comprises reacting carbon monoxide at pressures from about 500 p.s.i.g. to 10,000 p.s.i.g. and temperatures from about 150 to 230° C. with a ketyl prepared by the reaction of mono sodiobenzophenone and manganous chloride.
18. A process for preparing dimanganese decacarbonyl which comprises reacting carbon monoxide with a ketyl prepared by the reaction of mono sodiobenzophenone and manganous chloride wherein the maximum carbonylation temperature is 200° C. and the maximum carbon monoxide pressure is 3000 p.s.i.g.
19. A process for preparing chromium carbonyl which comprises reacting carbon monoxide with an intermediate prepared from the reaction of chromic chloride and mono sodiobenzophenone wherein the maximum carbonylation temperature is 150° C. and the maximum carbon monoxide pressure is 3000 p.s.i.g.

References Cited in the file of this patent

Deming: "General Chemistry," 5th edition, John Wiley and Sons, Inc., New York. Copyright 1944 (final page relied on).